(12) United States Patent
Sondgroth et al.

(10) Patent No.: US 12,520,845 B2
(45) Date of Patent: Jan. 13, 2026

(54) HIGH CONCENTRATION GLYPHOSATE AGROCULTURAL MATERIAL AND METHOD FOR USE

(71) Applicant: KB8, Inc., Tarzana, CA (US)

(72) Inventors: Broc Sondgroth, Hollister, CA (US); Eric Berg, Tarzana, CA (US)

(73) Assignee: KB8, 1nc., Tarzana (CA)

( * ) Notice: Subject to any disclaimer, the term of this patent is extended or adjusted under 35 U.S.C. 154(b) by 349 days.

(21) Appl. No.: 18/230,045

(22) Filed: Aug. 3, 2023

(65) Prior Publication Data

US 2024/0349728 A1    Oct. 24, 2024

Related U.S. Application Data

(60) Provisional application No. 63/461,138, filed on Apr. 21, 2023.

(51) Int. Cl.
*A01N 57/20*    (2006.01)

(52) U.S. Cl.
CPC .................................. *A01N 57/20* (2013.01)

(58) Field of Classification Search
None
See application file for complete search history.

(56) References Cited

U.S. PATENT DOCUMENTS

| | | | |
|---|---|---|---|
| 6,881,707 B2 | 4/2005 | Howat et al. | |
| 8,026,389 B2 | 9/2011 | Remer | |
| 9,066,513 B2 | 6/2015 | Spencer et al. | |
| 10,779,530 B2 | 9/2020 | Castelani et al. | |
| 2011/0071026 A1 | 3/2011 | Heide et al. | |
| 2011/0071027 A1 | 3/2011 | Heide et al. | |
| 2020/0404922 A1 | 12/2020 | Toledo et al. | |

FOREIGN PATENT DOCUMENTS

| | | | | |
|---|---|---|---|---|
| CN | 107746415 A | * | 3/2018 | ............ C07F 9/3813 |
| WO | 2008070947 A2 | | 6/2008 | |

* cited by examiner

*Primary Examiner* — Alton N Pryor
(74) *Attorney, Agent, or Firm* — Fulwider Patton LLP

(57) ABSTRACT

An herbicide is disclosed that allows an increase in the concentration of two types of glyphosate herbicide, monoisopropylamine (MIPA) and Potassium (K Salt) while maintaining efficacy without reliance on surfactants. The process and formulation produce a bioefficacy of a glyphosate composition that is significantly improved using specific combinations of natural inert ingredients, yielding higher concentrations of glyphosate salts while minimizing viscosity. That is, a formulation of a higher concentration product in a ready-to-sell form that has the same efficacy when diluted as less concentrated products currently available. This invention is more cost-effective to ship and takes up less storage space while requiring less manufacturing steps and cost associated.

26 Claims, No Drawings

HIGH CONCENTRATION GLYPHOSATE AGROCULTURAL MATERIAL AND METHOD FOR USE

CROSS-REFERENCES TO RELATED APPLICATIONS

This application claims priority to U.S. Ser. No. 63/461,138, filed Apr. 21, 2023, the contents of which is incorporated by reference herein in its entirety.

BACKGROUND

The present invention relates generally to herbicides, and more particularly to a low viscosity, liquid concentrate of an aqueous solution of a glyphosate salt introduced into an inert additive, surfactant-free, mixture to yield an herbicide with enhanced efficacy, stability and rain fastness.

Glyphosate (N-phosphonomethylglycine) is a non-selective herbicide constituent that is commonly used to control the growth of plants in a post-emergent manner. Glyphosate exhibits its herbicidal effects by, among other ways, inhibiting the shikimic acid pathway in plants. By inhibiting the shikimic acid pathway, the synthesis of aromatic amino acids and other secondary metabolites becomes obstructed. The obstruction disrupts protein synthesis, which ultimately results in plant death.

Glyphosate salt in aqueous solutions have been preferred from a commercial standpoint. The acid form of glyphosate has a low solubility in water and therefore glyphosate is typically introduced in salt form in an aqueous composition. In addition, glyphosate in salt form is significantly more biologically effective than the acid form of glyphosate. Various salt forms of glyphosate, which are used in aqueous compositions, have been described in the art (see, e.g., U.S. Pat. Nos. 3,799,758, 4,140,513, 4,315,765, 4,481,026, and 4,507,250, the contents of which are incorporated herein by reference). In particular, aqueous compositions containing potassium hydroxide (K-Salt), monoisopropylamine (MIPA), monomethylamine (MMA), ammonia (NH3), triethylamine (TEA), sodium hydroxide (NaOH), dimethylamine (DEA) and monoethanolamine (MEA) salt of glyphosate have seen previous commercial use.

Aqueous glyphosate salt compositions are typically sold in the form of concentrates. These concentrates are then diluted prior to plant treatment and most often include performance-enhancing surfactants. Surfactants are added to enhance the herbicide function by performing one or more of the following: increase herbicide solubility in water, act as a cosolvent for the herbicide, reduce surface tension of spray droplets (which can result in increased droplet retention on vegetation and spread on a leaf surface), enhance translocations and/or absorption of the herbicide and solubilization of cuticular leaf waxes.

Presently, glyphosate herbicides available for nonaquatic use in the market also incorporate various types of surfactants, such as tallow amine, alkyl glucoside, ethoxylates, betaines, and others as listed in U.S. Pat. Nos. 6,881,797 and 8,026,389, the contents of which are incorporated herein by reference. The inclusion of surfactants in the prior art is used to promote sustained efficacy when diluted for end use. The inclusion of surfactants also plays a critical role in enhancing the performance of herbicides by facilitating proper dispersion and adhesion to target surfaces, thereby maximizing the herbicidal effect. In contrast, formulations lacking surfactants necessitate less dilution of the glyphosate product, requiring application at higher concentrations, which in turn incurs higher costs in comparison. For instance, Glystar® Plus, offered by Albaugh, LLC of Ankeny, Iowa, employs 53.8% glyphosate salt combined with a surfactant. This formulation permits a dilution rate of 1 quart per acre for effective application. Conversely, a competing product by Ag Saver, LLC of McGehee, Arkansas, contains an identical level of glyphosate salt but lacking surfactants or other additives, may only be diluted down to a rate of 2 quarts per acre to achieve comparable results. The use of surfactants in glyphosate herbicides heretofore has been a crucial factor in optimizing the dilution process and reducing application costs while preserving desired efficacy levels.

Herbicide compositions in concentrate form can provide many advantages, such as in reduction in storage space, reduction in packaging material (e.g., container material), and improvements in shipping and handling efficiencies. Despite the advantages that liquid concentrates offer, there are various technical challenges associated with their use. For example, at high herbicide concentrations, and with the addition of additional components such as surfactants, the viscosity of MIPA-based concentrates can be very high. High viscosity can make the composition very difficult to handle, and create problems such as with pumping and measuring the composition. As such, high viscosity presents many challenges for the end user, typically one who prepares an application composition from the liquid concentrate. Lower temperatures can also increase the viscosity of the concentrates, making use in colder climates or colder months more difficult.

In the current market, high concentration formulas like Glystar® Plus typically contain approximately four pounds of acid per gallon (480 g/l) for MIPA-based products and 4.5 pounds (540 g/l) for Potassium Salt and mixed salt variations like Credit Xtreme® offered by NuFarm of Melbourne, Australia. This limitation arises from the necessity to incorporate sufficient surfactants (approximately 5-15%) to achieve the required efficacy or application rates. As a result, increasing the acid concentration in the final product beyond these levels leads to diminishing returns and increased viscosity.

K Salt formulations are widely favored due to their ability to accommodate a higher concentration of acid per gallon (4.5 pounds/540 g/l) compared to MIPA-based versions. However, they have inherent limitations concerning compatibility when mixed and applied with other herbicides, such as 24-D, Dicamba, and similar compounds. The combination of these herbicides with K Salt glyphosate may result in the precipitation of salts, causing formulation issues. Consequently, growers are compelled to either apply K Salt glyphosate separately or modify the other herbicides to enhance compatibility.

The presence of surfactants also present technical challenges in liquid concentrates. For example, it is known that some surfactants can reduce efficacy of glyphosate salt by interacting with it. It is also known that surfactants can increase the viscosity of the herbicidal formulation, further adding to the difficulties of high viscosities associated with high concentration liquid formulations. Additionally, there is diminishing efficacy as glyphosate concentration gets higher due to the fact there is such a high percentage of glyphosate salt and proportionally less available space for the needed ratio of surfactant for optimal performance when diluted. For example: If a 53.8% concentrate of glyphosate salt formula contains 10% surfactant, when a 75% concentration is made, this high level does not allow for the 10% surfactant as other components such as water and MIPA make up the remaining volume. The need for a certain percentage of surfactant limits the final concentration of glyphosate for this reason. In addition, there is also the fact that viscosity of a MIPA-based glyphosate formula increases proportionately to the percentage of glyphosate acid and MIPA in the formula. The thicker the product (more glyphosate and MIPA) the more difficult it is to handle, i.e., remove from containers and transfer by pump, especially in colder temperatures (below 40° F.).

Yet another technical challenge relates to the physical stability of the MIPA-based glyphosate composition, as well as the glyphosate salt that is contained therein. Storage of concentrate compositions at low temperatures can result in the precipitation, crystallization, or sedimentation of the glyphosate salt and/or secondary components, such as surfactants, out of the composition. Storage of concentrate compositions at high temperatures can result in the phase separation of components of the composition. These types of changes are generally undesirable as they can render the liquid concentrate composition unusable, less effective, or may require one or more corrective processing steps to return the liquid concentrate to a usable form.

Currently, the manufacturing process of glyphosate involves an initial reaction of the acid and base material or amine such as MIPA or K-Salt to produce a concentrated salt. Subsequently, this liquid salt is diluted to attain a sellable and stable concentration, and in certain instances, surfactants are added to achieve the desired marketable level. As an alternative, manufacturers have the option to procure pre-reacted concentrated salt solutions, known as Manufacturing Use Products (MUPs). The standard industry MUP composition comprises 62% glyphosate salt when formulated with MIPA (780 g/l salt) and 58% glyphosate salt (m/m) when formulated with K salt (870 g/l). These concentrates are subsequently diluted while surfactant is added to meet the current market levels before being made available to consumers. Consequently, the end product necessitates the storage of larger quantities of materials, resulting in higher manufacturing costs and increased shipping expenses. However, the present invention overcomes this limitation and enables the achievement of salt concentrations ranging up to 75% in finished products without compromising efficacy. This breakthrough allows for a substantial increase in finished product concentrations from 53.8% salt to 75% for MIPA-based formulations and from 48% to 75% for K-salt formulations.

Additionally, different glyphosate salts have different molecular weights. The atoms that make up the salts (and any other chemical structure for that matter) have markedly different weights on an atomic scale. While the glyphosate acid molecular weight is the same ($C_3H_8NO_5P$) in each formulation, the salt differs from base to base. So it is an important consideration that in such herbicides the "active ingredient" (AI) is the salt formulation (e.g., glyphosate isopropylamine) and that each of the different active ingredients has a slightly different molecular weight.

In order to prepare a highly concentrate glyphosate salt, a high purity, low water content glyphosate acid preparation is needed. The glyphosate acid preparation can be a product of any particular known synthetic processes for preparing glyphosate acid. Various routes for the synthesis of glyphosate acid are known in the art. One route, the "glycine route," involves the phosphonomethylation of glycine. For example, chloroma ethyl-phosphonic acid can be reacted with glycine in basic conditions. In another glycine route, dimethyl phosphate is reacted with glycine to form glyphosate. Another route is the catalytic oxidation of N(phosphonomethyl)iminodiacetic acid (PMIDA). The PMIDA route generally involves mixing PMIDA with water and an acid (such as Sulfuric acid), and then heating the mixture to an elevated temperature. An oxidizing agent (such as an inorganic peroxide, like hydrogen peroxide, or an organic peroxide) is then added, which oxidatively converts iminodiacetic acid to glyphosate acid. Oxidation can be performed in the presence of a noble metal catalyst such as platinum, immobilized on a support. Precipitation of glyphosate acid can be achieved by precipitation, using a water-miscible organic solvent. Decomposition products observed using the PMIDA route include glyphosine, glycine, iminodiacetic acid, M-formylglyphosate, PMIDA, (aminomethyl)phosphonic acid (APMA), N-methyl-N-(phosphonomethyl glycine (MePMG), and N—N bis(phosphonomethyl)amine (bPMNH).

Besides the glyphosate-salt that makes up the active ingredient in each formulation, there are other additives of most herbicide products. Some of these influence the physical properties that affect handling, storage stability, etc. Others take the form of surfactants and adjuvants that impact the manner in which the herbicide penetrates the leaf surface. The surfactants (types and loading) are proprietary information and are not reported in the same way as the active components, so this can be difficult to ascertain. However, one way that price points can be reduced in this competitive market is to reduce or change the surfactant packages. Thus, even if the active ingredient is the same between two products, they could have substantially different surfactant loading that can impact weed control efficacy (amount of herbicide getting to the target enzyme in the plants). Historically, if one were to use a low-surfactant-load glyphosate product, one would consider adding appropriate surfactants to make up for it.

Consequently, the present invention recognizes and addresses these important aspects, providing a novel glyphosate herbicide formulation that maintains or even enhances efficacy, and cost-effectiveness in typical applications, without the use of surfactant while allowing higher concentrations with higher dilution rates.

SUMMARY OF THE INVENTION

The present invention provides methods and compositions that not only offer technical advantages of enhanced low-temperature stability, rain fastness and absorption associated with glyphosate use, but that also reduce storage and shipping & handling cost due to the concentrated, reduced viscosity form. The invention pertains to a highly concentrated liquid formula, that is slurry-free and particulate-free. This innovative formula achieves a reduced viscosity through careful balancing of ingredient ratios and an inert additive, resulting in a market-ready product that can be applied at the same or superior rates as lower concentrated alternatives without requiring the inclusion of surfactants. Notably, the absence of surfactants in the formulation enables the incorporation of higher levels of glyphosate's active components.

Despite the surfactant-free nature, the invention retains the desirable efficacy benefits observed when prior art formulations including surfactants are employed. This is attributed to the introduction of an inert additive that enhances the adhesion and absorption of glyphosate into the cuticle, stomata, or plant walls, effectively eliminating the necessity for surfactants. This serves to further enhance the overall effectiveness and efficiency of the disclosed invention. Accordingly, the present patent application introduces a novel highly-concentrated fluid liquid formula that surpasses the performance of lower concentrated products in terms of application rates, all without the need for surfactants. The incorporation of an innovative inert additive not only enables higher levels of glyphosate but also promotes improved adhesion and absorption of the active ingredient, providing a substantial improvement over existing solutions. The inert additive of the present invention's formulation is preferably incorporated at 0.1 to 15% by weight. The inert additive is comprised of one or more vegetable, cereal or legume-derived extracts in a dry or liquid form to serve as a surface activation agent when mixed with an amino acid compound derived from protein hydrolysis extract as an activation agent.

The present invention's formulation allows an increase in the concentration of two types of glyphosate herbicide, monoisopropylamine (MIPA) based from 53.8% salt to 75%, and Potassium (K Salt) based from 48% salt to 75%, while maintaining efficacy without the need for surfactants or reduced use of surfactants. The process and formulation produce a bioefficacy of a glyphosate composition that is significantly improved using specific combinations of natural inert ingredients, yielding higher concentrations of glyphosate salts while minimizing viscosity. That is, a formulation of a higher concentration product in a ready-to-sell form that has the same efficacy when diluted as less concentrated products currently available. This invention is more cost-effective to ship and takes up less storage space while requiring less manufacturing steps and less cost.

The present invention also represents an advancement and improvement over MUP concentrate and transitions them from intermediate components in a formula to ready-to-sell products. Currently, MUPs are made or bought and then processed further by adding surfactant and diluting to various concentrations the industry sells today as a finished product. Conversely, the present invention's concentrate is equal or even higher concentration than current 62% MIPA-based or 58% K Salt-based MUP and a ready-to-sell product that does not require additional processing. The commercial product has a much higher efficacy and higher application rate than available MUPS, yielding a significant advantage over current products.

The invention also provides for further efficacy, enhanced cold temperature stability, viscosity modification and compatibility with other herbicides with the inclusion of certain types of glycols and/or alcohols. Alcohols examples are Isopropyl Alcohol, Ethyl Alcohol, Methyl Alcohol and Fatty Alcohols. Glycol examples are Propylene Glycol, Ethylene Glycol, Butylene Glycol, Dipropylene Glycol, and Polyethylene Glycol. The combination of the inert additive with certain glycols and/or alcohols have shown to improve compatibility of K-Salt formulations when mixed and applied with other herbicides. When added to K salt formulations, the invention reduces the tendency for incompatibility and precipitates (drop out) to form when mixed prior to application by end users.

Glycols or the combination of the inert additives and certain glycols added to any concentration of MIPA-based glyphosate as part of the method and formula have shown to improve cold weather stability and prevent or reduce crystallization or precipitates (drop out). While current MIPA-based glyphosates, most notably concentrations above 53.8% may start to crystalize below a temperature of 20° F., the current invention prevents crystallization or drop out below 0° F. and as low as −40° F.

Through the present approach a MIPA-based version with an acid concentration matching or even exceeding that of K salt formulations is achievable. This approach offers the distinct advantage of improved compatibility with other herbicides while effectively minimizing the common increase in viscosity and low-temperature crystallization associated with MIPA usage. By achieving comparable or higher acid concentrations without compromising compatibility or encountering substantial viscosity issues, this innovation opens new possibilities for more effective and efficient herbicidal applications.

DETAILED DESCRIPTION OF THE PRESENT INVENTION

Currently there are various concentrations of active technical glyphosate acid powder (~95%). Using a lower technical grade is not as effective, as the lower starting concentration results in a lower formulated concentration. Acids of up to 95% are very popular but viewed as of a lesser quality. To achieve the levels of concentrations found in the present invention, a glyphosate acid powder of at least 97% material is used as a base constituent. A powder of this concentration also reduces the amount of material shipped overtime.

In various embodiments of the present invention, technical glyphosate acid powder (97-99% concentration) can be utilized to form glyphosate salt. While 95% technical glyphosate acid is commonly favored for its cost-effectiveness in lower concentration formulas, its use is unsuitable for the present invention due to several reasons. Firstly, employing lower percentage technical grades, such as 95%, imposes limitations on achieving the desired final formulated concentration. Additionally, these lower concentration grades may contain higher levels of impurities such as formaldehyde which could have a detrimental impact on the stability of the product over time.

To achieve the higher concentrations required for the present invention, it is preferable to start with at least 97% and more preferably 98% technical glyphosate salt material. By using this higher purity grade, the desired concentrations can be readily attained, ensuring the efficacy and stability of the final product. Furthermore, employing at least 97% material also results in reduced material shipments over time, contributing to greater efficiency and cost-effectiveness in the manufacturing process.

Additionally, an unintended consequence of creating higher concentrations of glyphosate salt is the introduction of unreacted glyphosate acid particles based on the type of components, concentration and mixing procedures. These acid particles have a size of 1 μm or greater and can comprise over 1 percent by weight of the final mixture. As a result, various filtration methods are typically used to remove the particles that add no efficacy and can contribute to higher viscosity as discussed in US Patent Publication No. 2011/0071027 A1, the content of which is incorporated herein by reference. The present invention does not introduce such acid particles and therefore requires no filtration of these particles in order to achieve maximize efficacy concentration and minimize viscosity.

The present invention reduces the viscosity of an herbicide without diluting or reducing the effectiveness of the glyphosate salt. Herbicides using the present invention can have viscosities ranging from 35 to 2000 centipoise (cP) at 77° F. depending on temperature, type of glyphosate acid and concentration of glyphosate salt. For example: a 70% MIPA-based glyphosate salt formula with the present invention can have a viscosity of 300 cP at 77° F. and increase to over 900 cP at 40° F. Table 1 shows how the absence or reduction of surfactant and the addition of the inert additive described in this invention provides a lower viscosity for MIPA-based glyphosate. For comparative purposes, a popular name brand herbicide is provided for comparison that contains 4.5 pounds of acid and a surfactant. Example A has the same concentration of acid as the name brand and was made with the inert additive in the present invention but no surfactant. The result is an 18% reduction in viscosity at 40° F. as measured in centipoise. Example B has 11% more acid which typically would yield a viscosity well above that in the name brand product due to the higher concentration, yet the viscosity is still lower by 8.5%.

TABLE 1

|  | Name Brand Herbicide | Example A: Invention- MIPA formula with inert additive | Example B: Invention-MIPA formula with inert additive |
| --- | --- | --- | --- |
| Pounds of Acid | 4.5 | 4.5 | 5 |
| Viscosity at 40° F. | 1000 cP | 820 cP | 915 cP |
| % Difference – Viscosity Reduction |  | 18% | 8.5% |

The inert additive of the present invention's formulation is preferably incorporated at 0.1 to 15% by weight. The inert additive is comprised of one or more vegetable, cereal or legume-derived extracts in a dry or liquid form to serve as a surface activation agent when mixed with an amino acid compound derived from protein hydrolysis as an extract activation agent. An antimicrobial agent such as a mix of 1,2-Benzisothiazolin-3-one, 5-Chloro-2-methyl-4-isothiazolin-3-one, and 2-Methyl-4-isothiazolin-3-one may or may not be added to the mixture as a preservative. An option to the dry version is the addition of either ammonium sulfate, ammonium thiosulfate or urea And exemplary ratio of ingredients that constitute the inert additive range from fifty to ninety nine percent (surface activation agent), one to twenty-five percent amino acid (extract activation agent), and ten to fifty percent preservative, and optional 10% to 50% ammonium sulfate, ammonium thiosulfate or urea all by weight.

Procedure of Mixing Inert Additive Package (Dry Version)

The surface activation agent is added to a horizontal ribbon mixer, a vertical ribbon mixer, a multi-port gravity blender or a recirculating anti-gravity blender. and stirred at 40 to 80 rpm. The extract activation agent is added while continued stirring. The preservative is then added followed by the ammonium sulfate, ammonium thiosulfate or urea while blending is continued until uniform, approximately 30 minutes.

The inert additive may be modified into a liquid form with the inclusion of certain types of alcohols and/or glycols to impart cold temperature stability, viscosity modification and compatibility with other herbicides. Alcohols examples are Isopropyl Alcohol, Ethyl Alcohol, Methyl Alcohol and Fatty Alcohols. Glycol examples are Propylene Glycol, Ethylene Glycol, Butylene Glycol, Dipropylene Glycol, and Polyethylene Glycol. An exemplary composition for the liquid form of the inert additive is:

0.1 to 25% inert additive (Dry Version).

0.1 to 99% Propylene Glycol.

0.1 to 99% Filtered, Deionized or Reverse Osmosis Water

A procedure for mixing an inert additive package (Liquid Version) comprises filling a mixing vessel with the total amount of water and/or propylene glycol and begin stirring at 60 to 100 rpm. Slowly add the inert additive (Dry Version). Continue stirring until consistent and well dispersed.

Example of MIPA and K Salt Based Glyphosate

Ratios and exemplary formula for MIPA-based Glyphosate made with the invention.

22 to 37% Filtered, Deionized or Reverse Osmosis Water 45 to 50% Glyphosate acid, Technical (98% or greater)

18 to 28% MIPA (99.9%) Preferred concentration to reduce amount of any impurities or water.

0.1 to 15% inert additive (dry or liquid)

Optional: 0 to 5% by weight of surfactant

Ratios and exemplary formula for Potassium (K salt) based Glyphosate made with the invention.

0.1 to 30% Filtered, Deionized or Reverse Osmosis Water 40 to 52% Glyphosate acid, Technical (Greater than 98%)

26 to 50% Potassium Hydroxide 50% (KOH).

0.1 to 15% inert additive (dry or liquid)

Optional: 0 to 5% by weight of surfactant

Concentration of water may be adjusted lower if KOH concentration is lower than 50% so the desired net concentration of KOH is achieved. Also, KOH flake may be substituted for KOH 50% or any liquid form by adjusting the amount of water used.

Example 1 Procedure—MIPA-Based Glyphosate

Charge a reactor or jacketed mixing vessel with the total amount of water and begin stirring at 60 to 100 rpm. Add the glyphosate acid incrementally, 5% of total weight at a time. Stir solution until "slurry" is consistent and well dispersed before adding additional acid. Once all acid is added to the water and the solution is homogeneous, continue stirring and slowly start adding the monoisopropylamine to the slurry at a rate where the solution does not exceed 75° C. and preferably maintains between 61 to 65° C. Once all monoisopropylamine has been added, test for pH and density, where pH should range between 4.5 and 5.2 and more specifically 4.85 to 5.2. Add additional monoisopropylamine if pH is low. Continue stirring for at least 45 minutes and preferably 1 hour or until completely clear with no haze while maintaining a solution temperature between 50° and 75° C. but preferably 61 and 65° C. Solution should be clear. Add the inert additive package and continue stirring for 15 to 30 minutes or until completely dispersed. The inert additive can cause the solution to be hazy after addition.

TABLE 2

Table 2 Efficacy and rainfastness of inert additive.

|  |  |  | % visual control at 14 and 21 days after treatment (DAT) | | | | | |
|---|---|---|---|---|---|---|---|---|
|  |  |  | 1 hr Rainfast | | 30 min. Rainfast | | 0 min. Rainfast | |
|  |  | RATE | 14 DAT | 21 DAT | 14 DAT | 21 DAT | 14 DAT | 21 DAT |
| Trial 1 | | | | | | | | |
| Trt A | Formulation 1 480 g/l | 249 g ae/ha | 50% | 50 | 20 | 40 | 0 | 0 |
| Trt B | Roundup WeatherMaxx (Canada) 540 g/l | 280 g ae/ha | 50 | 30 | 20 | 40 | 0 | 0 |
| Trt C | Canadian Generic Hi load formulation 540 g/l | 280 g ae/ha | 40 | 20 | 0 | 25 | 0 | 0 |
| Trial 2 | | | | | | | | |
| Trt A | Formulation 1 480 g/l | 400 g ae/ha | 75 | 90 | 20 | 60 | 0 | 0 |
| Trt B | Roundup WeatherMaxx (Canada) 540 g/l | 450 g ae/ha | 75 | 85 | 30 | 60 | 0 | 0 |
| Trt C | Canadian Generic Hi load formulation 540 g/l | 450 g ae/ha | 60 | 75 | 20 | 50 | 0 | 0 |

An exemplary formulation of the present invention is featured in Table 2 above, The composition (Formula 1) was prepared from aqueous concentrates, the formulation of which exhibits enhanced performance compared to commercially available glyphosate concentrates. The evaluation involved conducting comparative testing with two well-known products: Roundup WeatherMaxx®, manufactured by Bayer, and a generic Hi-load 540 g/l formula.

The unique feature of Formula 1 lies in the incorporation of a surfactant-free inert additive, which significantly contributed to its superior performance during the evaluations. To showcase its efficacy, Formula 1 was tested at lower glyphosate rates (249 g ac/ha and 400 g ac/ha) and compared against Roundup WeatherMaxx, which is widely acknowledged for its surfactant capabilities, at higher rates (280 g ac/ha and 450 g ac/ha). The testing involved applying the various compositions to an assortment of broadleaf weeds in wheat crops, and to further simulate a post-rain environment, pivot irrigation was applied, delivering 0.3 inches of water 30 and 60 minutes after treatment. The effectiveness of the compositions was assessed based on the percent of control achieved at 14 and 21 days after treatment.

Incorporating the element of rainfastness or "wash-off" was essential in demonstrating the superior performance and control of Formula 1. The results from the trials clearly showed that Formula 1 outperformed both competitive products, even though it contained 11% less glyphosate (480 g/l) compared to the standard concentration of 540 g/l. Specifically, Trial 1 revealed that Formula 1 achieved 50% control, whereas Roundup WeatherMaxx only attained 30% control. In Trial 2, Formula 1 demonstrated an impressive 90% control, surpassing Roundup WeatherMaxx's performance of 85%. These results exemplify the superior capabilities of Formula 1 and its efficiency in weed control and management. The incorporation of the surfactant-free inert additive clearly differentiates it from traditional surfactant-containing formulas and highlights its effectiveness under challenging post-rain conditions. The innovative herbicide application composition of the present invention thus offers improved performance, control, and cost-effectiveness for agricultural applications.

Example 2 Procedure for Potassium (K Salt)-Based Glyphosate Herbicide

Charge a reactor or jacketed mixing vessel with the total amount of water and begin stirring at 60 to 100 rpm. Add the potassium hydroxide (KOH) to the water. Slowly add the glyphosate acid at a rate where the solution does not exceed 60° C. Once all the glyphosate acid has been added, test for pH and density, where pH should range between 4.4 and 5.2. Add additional KOH if pH is low. Continue stirring for 45 minutes to 1 hour while maintaining a solution temperature between 55 and 60° C. Solution should be clear. Add the inert additive package and continue stirring for 15 to 30 minutes or until completely dispersed.

The present invention results in an altered approach in the example of a MUP concentrate. Currently, MUP concentrate is made or bought and then processed further by adding surfactant and diluting with water to what the industry sells today as a finished product. Conversely, the present invention's concentrate is an even higher concentration to current maximum 62% MIPA-based or 58% K salt-based MUP and results in a ready to sell product that does not require additional processing or diluting. The commercial product has a much higher efficacy per weight than available MUPS, yielding a significant advantage over current products.

Additional components or ingredients other than the inert additive(s) or surfactants can be included in the concentrate. However, if included, they are desirably kept at lower concentrations to allow for a very high concentration of the glyphosate salt in the aqueous concentrate. Other optional ingredients that can be included in the composition include, but are not limited to, antifoam agents, compatibility agents, neutralizing agents and buffers, corrosion inhibitors, dyes, odorants, penetration aids, wetting agents, spreading agents, thickening agents and the like. These optional ingredients can alternatively be introduced into an application mixture (tank mix) when the concentrate is diluted prior to use depending on other herbicides, fertilizers or agricultural chemicals being applied at the same time in a tank mix.

The present invention's formulation allows an increase in the concentration of two types of glyphosate herbicide, monoisopropylamine (MIPA) based from 53.8% salt to 75%, and Potassium (K Salt) based from 48% salt to 75%, while maintaining efficacy without the need for surfactants or reduced use of surfactants. In a preferred embodiment, the concentration range is 55% to 75% by weight for MIPA, a more preferred embodiment is 58%-75% for MIPA, and an even more preferred embodiment is 65%-75% for MIPA. Similarly, a preferred embodiment of the concentration range is 50%-75% by weight for K Salt, a more preferred embodiment is 55%-75% for K Salt, and an even more preferred embodiment is 60%-75% for K Salt, and even more preferred embodiment is 65%-75% by weight. The process and formulation produce a bioefficacy of a glyphosate composition that is significantly improved using specific combinations of natural inert ingredients, yielding higher concentrations of glyphosate salts while minimizing viscosity.

An inert additive, or a combination of inert additive and Glycol and/or Alcohol can be used to form the liquid glyphosate concentrate. Generally, this inert additive combination is added at a level so the concentration of the glyphosate salt does not fall below about 45 percent weight. More preferably, the inert additive is added to the concentrated glyphosate salt composition so the concentration of the glyphosate salt does not fall below about 50 percent by weight, and more preferably not below 55 percent by weight, and even more preferably not below 60 percent by weight, and even more preferably not below 65% by weight, or up to the limit of solubility of the salts.

While certain preferred embodiments of the invention have been described and depicted above, the present invention is not limited to only those embodiments described herein. For example, while the present disclosure focuses primarily on embodiments based on MIPA and K Salt based glyphosate, the present invention can also be applied to other options for nitrogen bases in glyphosate including monomethylamine (MMA), ammonia (NH3), triethylamine (TEA), sodium hydroxide (NaOH), dimethylamine (DEA), monoethanolamine (MEA) and any combination of nitrogen base salt of glyphosate using techniques and methods disclosed herein. A person of ordinary skill in the art would readily recognize these and other modifications and substitutions to the versions of the embodiments, and the invention's scope is intended to include all such modifications and substitutions. Accordingly, the scope of the invention is properly determined by the words of the appended claims using their customary and ordinary meanings, consistent with but not limited by the foregoing descriptions and depictions.

We claim:

1. An herbicide formed of glyphosate, comprising:
   purified water;
   glyphosate acid having a purity of greater than 97%;
   monoisopropylamine (MIPA); and
   an inert additive selected from a group consisting of an extract of vegetable, cereal and legume;
   wherein the herbicide includes no greater than two percent surfactant by weight.

2. The herbicide of claim 1, wherein the surfactant concentration is zero.

3. The herbicide of claim 1, wherein the glyphosate acid makes up between forty-five percent and fifty percent of the herbicide.

4. The herbicide of claim 1, wherein the MIPA makes up between fifteen and thirty percent of the herbicide.

5. The herbicide of claim 1, wherein the inert additive makes up between one tenth of one percent and fifteen percent of the herbicide.

6. The herbicide of claim 1, wherein the herbicide resists crystallization below zero degrees Fahrenheit.

7. The herbicide of claim 1, wherein the herbicide resists crystallization below negative forty degrees Fahrenheit.

8. The herbicide of claim 1, further comprising a glycol.

9. The herbicide of claim 1, further comprising an alcohol.

10. The herbicide of claim 1, wherein a concentration of glyphosate salt is greater than fifty five percent (55%) by weight.

11. The herbicide of claim 1, wherein a concentration of glyphosate salt is greater than fifty eight percent (58%) by weight.

12. The herbicide of claim 1, wherein a concentration of glyphosate salt is greater than sixty percent (60%) by weight.

13. The herbicide of claim 1, wherein a concentration of glyphosate salt is greater than sixty-five percent (65%) by weight.

14. The herbicide of claim 1, wherein at least a portion of the glyphosate acid is prepared by a glyphosate-acid synthesis process comprising catalytic oxidation of N-(phosphonomethyl) iminodiacetic acid (PMIDA).

15. An herbicide formed of glyphosate, comprising:
    purified water;
    glyphosate acid having a purity of greater than 97%;
    Potassium Hydroxide; and
    an inert additive selected from a group consisting of an extract of vegetable, cereal and legume;
    wherein the herbicide includes no greater than two percent surfactant by weight.

16. The herbicide of claim 15, wherein the surfactant concentration is zero.

17. The herbicide of claim 15, wherein the glyphosate acid makes up between forty percent and fifty-five percent of the herbicide.

18. The herbicide of claim 15, wherein the potassium hydroxide makes up between twenty-five and fifty percent of the herbicide.

19. The herbicide of claim 15, wherein the inert additive makes up between one tenth of one percent and fifteen percent of the herbicide.

20. The herbicide of claim 15, further comprising a glycol.

21. The herbicide of claim 15, further comprising an alcohol.

22. The herbicide of claim 15, wherein a concentration of Potassium Hydroxide based salt is greater than fifty percent (50%) by weight.

23. The herbicide of claim 15, wherein a concentration of Potassium Hydroxide based salt is greater than fifty five percent (55%) by weight.

24. The herbicide of claim 15, wherein a concentration of Potassium Hydroxide based salt is greater than sixty percent (60%) by weight.

25. The herbicide of claim 15, wherein a concentration of Potassium Hydroxide based salt is greater than sixty-five percent (65%) by weight.

26. The herbicide of claim 15, wherein at least a portion of the glyphosate acid is prepared by a glyphosate-acid synthesis process comprising catalytic oxidation of N-(phosphonomethyl) iminodiacetic acid (PMIDA).

* * * * *